UNITED STATES PATENT OFFICE.

GERHARD NICOLAAS VIS, OF BARMEN, GERMANY, ASSIGNOR TO DAHL & CO., OF SAME PLACE.

ORTHOOXYETHYL-ALPHA-BENZOYLAMIDO-QUINOLIN.

SPECIFICATION forming part of Letters Patent No. 512,590, dated January 9, 1894.

Application filed October 19, 1892. Serial No. 449,333. (Specimens.) Patented in Germany January 10, 1892, No. 65,111.

*To all whom it may concern:*

Be it known that I, GERHARD NICOLAAS VIS, a subject of the Queen of the Netherlands, residing at Barmen, Prussia, Germany, have invented certain new and useful Improvements in Orthooxyethyl-alpha-benzoylamido-quinolin, (for which I have obtained German Patent No. 65,111, dated January 10, 1892,) of which the following is a specification.

The ortho oxyethyl-amido quinolin

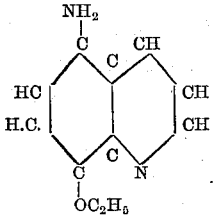

previously described in the *"Journal für praktische Chemie"* (*Neue Folge* tom 45, page 541) or the hydrochloric acid salt of the same, furnished when boiled with benzoylchlorid the ortho-oxyethyl-monobenzoylamido quinolin

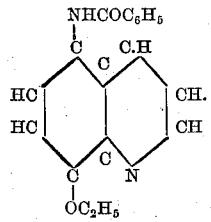

This forms small yellow needles which are scarely soluble in water, more readily soluble in alcohol and melt at 206° centigrade. The ortho oxyethyl-benzoylamido quinolin may moreover be readily produced by shaking the ortho oxyethylamido-quinolin, suspended in water with an equal weight of benzoylchlorid and the necessary quantity of soda lye to fix the hydrochloric acid which is set free. The excess of benzoylchlorid is removed by treatment with soda lye until the odor vanishes; then filter off, and wash out the ortho oxyethyl-benzoylamido-quinolin which remains behind. The product thus obtained, has a melting point of 200° to 202° centigrade and with one recrystallization from alcohol is obtained pure. (Melting point 206° centigrade.)

The ortho oxyethyl-benzoylamido quinolin possesses anti-neuralgic and anti-pyretic properties, and is intended for therapeutic application.

*Example of the process of production.*—The hydrochloric acid salt of ortho oxyethyl amido quinolin is boiled with double its quantity of benzoylchlorid, the mass from the reaction boiled with water, and then treated with ammonia, and the part remaining after filtration is recrystallized out of alcohol. The benzoyl product, at once pure, with melting point 206° centigrade is the result. If it is desired to proceed with the benzoylizing in the cold, the ortho ethoxy-amido-quinolin is stirred with water, equal its own weight of benzoylchlorid added, and soda lye in quantity equivalent to the hydrochloric acid which becomes free, then gradually runs in under active stirring, and then with occasional stirring a sufficient quantity of soda lye is added until the odor of benzoylchlorid vanishes; is then filtered from the ortho-ethoxy-benzoylamido quinolin and purified by recrystallizing from alcohol. For instance the following proportions may be used: one hundred grams ortho ethoxy-amido quinolin, five hundred grams water, and one hundred grams benzoylchlorid are mixed and 21.5 grams soda ash (NaO.H.) dissolved in one hundred grams water then gradually run in with active stirring. Or one may dissolve the hydrochloric salt or tin double salt, as obtained according to the description in the *"Journal für praktische Chemie"* (*Neue Folge* tom 45, page 541) add soda lye until the reaction is neutral, and proceed according to the above given quantities, noting that one hundred grams ortho ethoxy-amido-quinolin are equal to about one hundred and twenty grams of the hydrochloric salt or about one hundred and seventy grams of the tin double salt. It will of course be understood that the above proportions are not exactly binding, but may be somewhat varied from, and are given as a sufficiently practical illustration of the method of carrying out my invention sufficient for chemists versed in this branch of chemistry.

The ordinary dose of the product is from three to four grams per day.

Having thus fully described my invention, what I claim as new, and desire to secure by Letters Patent of the United States, is—

1. The herein described oxyethyl-monobenzoylamido quinolin in the form of small needles melting at 206° centigrade, scarcely soluble in water and more readily soluble in alcohol and possessing anti-neuralgic and antipyretic properties, substantially as set forth.

2. The method of producing ortho-oxyethyl-monobenzoyl amido quinolin which consists in treating aethoxy amido quinolin or a hydrochloric acid salt thereof with benzoyl-chlorid, substantially as described.

In testimony whereof I have signed my name to this specification in the presence of two subscribing witnesses.

GERHARD NICOLAAS VIS.

Witnesses:
H. CHULT,
ERNST HIEBER.